United States Patent [19]
Ball et al.

[11] Patent Number: 5,496,068
[45] Date of Patent: Mar. 5, 1996

[54] INERTIA SENSITIVE BUCKLE FOR SEAT BELT PRETENSIONER SYSTEM

[75] Inventors: Keith R. Ball, New Baltimore; Timothy J. Cahill, Dryden; Robert P. Ellis, Almont; Charles W. Sorenson, Utica; Carl M. Petersen, III, Waterford, all of Mich.

[73] Assignee: TRW Vehicle Safety Systems Inc., Lyndhurst, Ohio

[21] Appl. No.: 376,111

[22] Filed: Jan. 20, 1995

[51] Int. Cl.$^6$ .............................. B60R 22/46; A44B 11/26
[52] U.S. Cl. ................. 280/806; 24/633; 24/642
[58] Field of Search ...................... 24/633, 642; 280/806; 297/480

[56] References Cited

U.S. PATENT DOCUMENTS

| | | |
|---|---|---|
| 4,622,727 | 11/1986 | Wier .......................................... 24/642 |
| 5,066,042 | 11/1991 | Föhl ......................................... 280/806 |
| 5,097,571 | 3/1992 | Fohl .......................................... 24/633 |
| 5,115,543 | 5/1992 | Föhl .......................................... 24/633 |
| 5,142,749 | 9/1992 | Biller ......................................... 24/636 |
| 5,213,365 | 5/1993 | Fohl .......................................... 24/633 |

FOREIGN PATENT DOCUMENTS 3533684  2/1987  Germany .................................. 24/633

Primary Examiner—Brian L. Johnson
Assistant Examiner—Peter C. English
Attorney, Agent, or Firm—Tarolli, Sundheim & Covell

[57] ABSTRACT

A pretensioner (40) is connected with a seat belt buckle (32) and is operable to move the buckle through a pretensioning stroke to remove slack from a seat belt. Movement of an actuator member (36) from an unactuated position to an actuated position under the influence of its own inertia at the end of a pretensioning stroke is resisted by a pair of counterbalance assemblies (162, 164) disposed in the buckle (32). The counterbalance assemblies (162, 164) include masses (168, 176) having inertia which results in the application of force against counterbalance cams (212, 232) connected with the actuator member (36). This force resists movement of the actuator member (36) to an actuated position at the end of the pretensioning stroke. Upon the application of manual force against an outer end portion of the actuator member (36) to release the buckle, the masses (168, 176) are pivoted by the counterbalance cams (232, 212). Cam followers (196) connected with the masses then slide along longitudinally extending side surfaces (216, 240) of the counterbalance cams (212, 232). The counterbalance masses (168, 176) are mounted between elongated sections (132, 134, 148 and 150) of the actuator member (36).

21 Claims, 6 Drawing Sheets

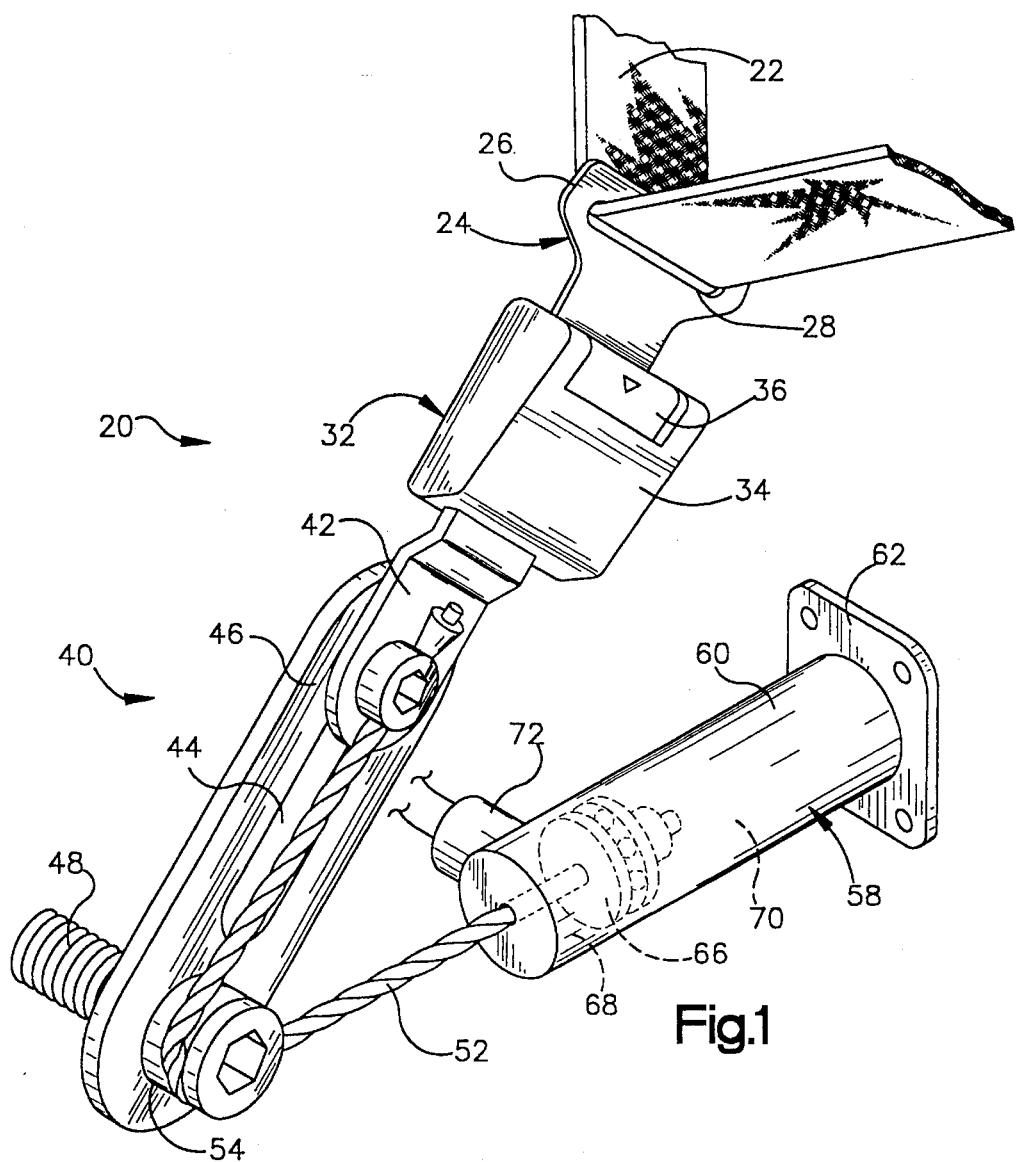
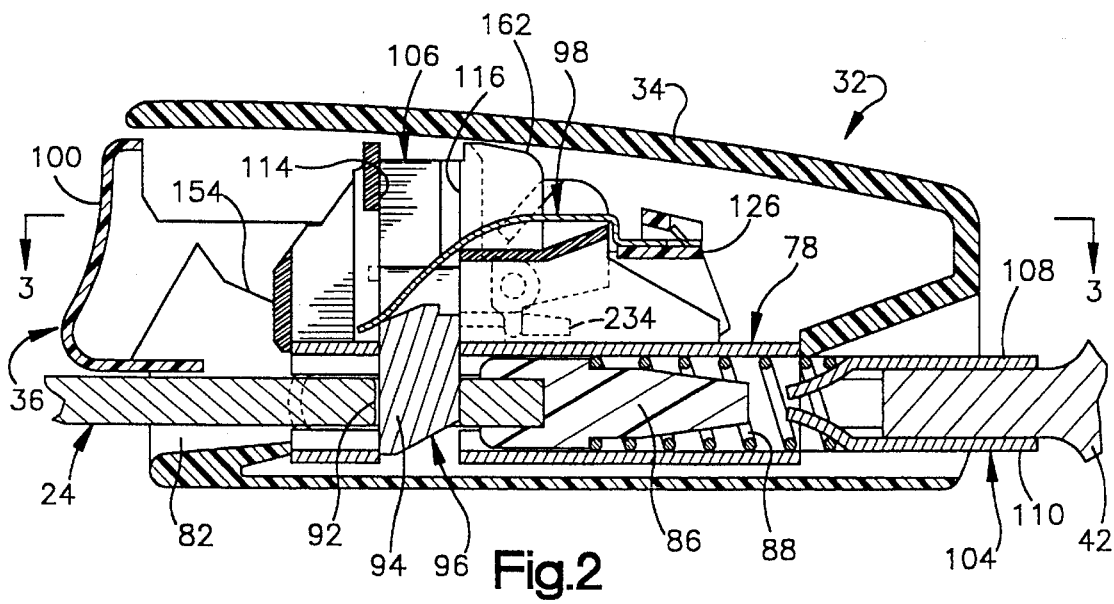
Fig.1
Fig.2

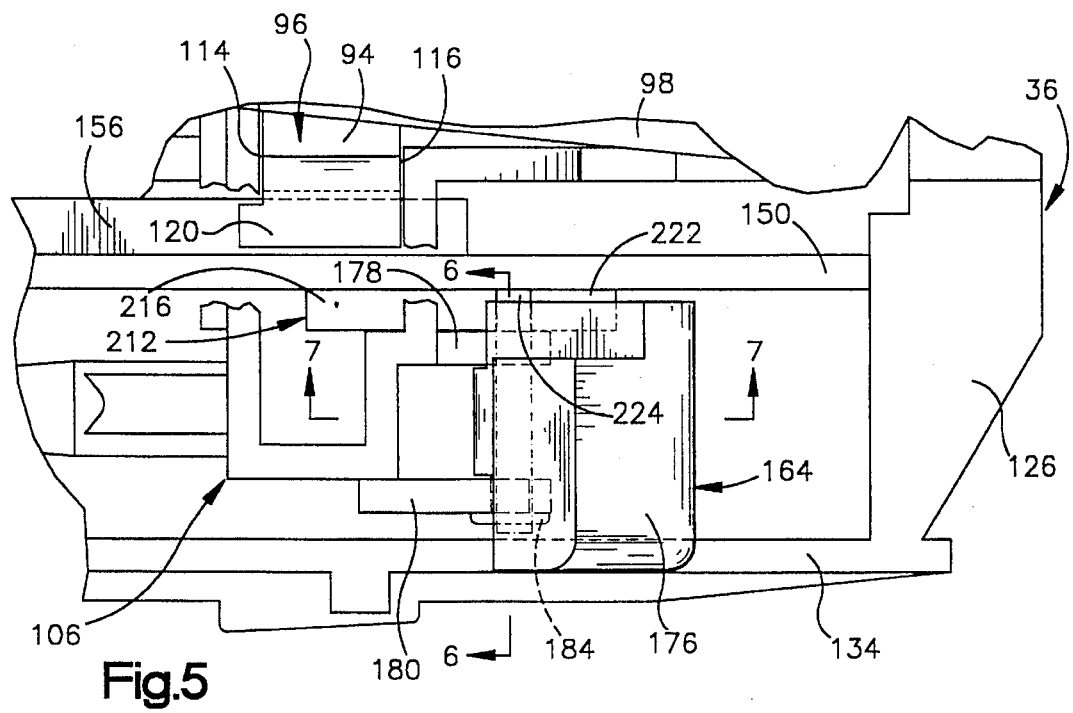
Fig.5
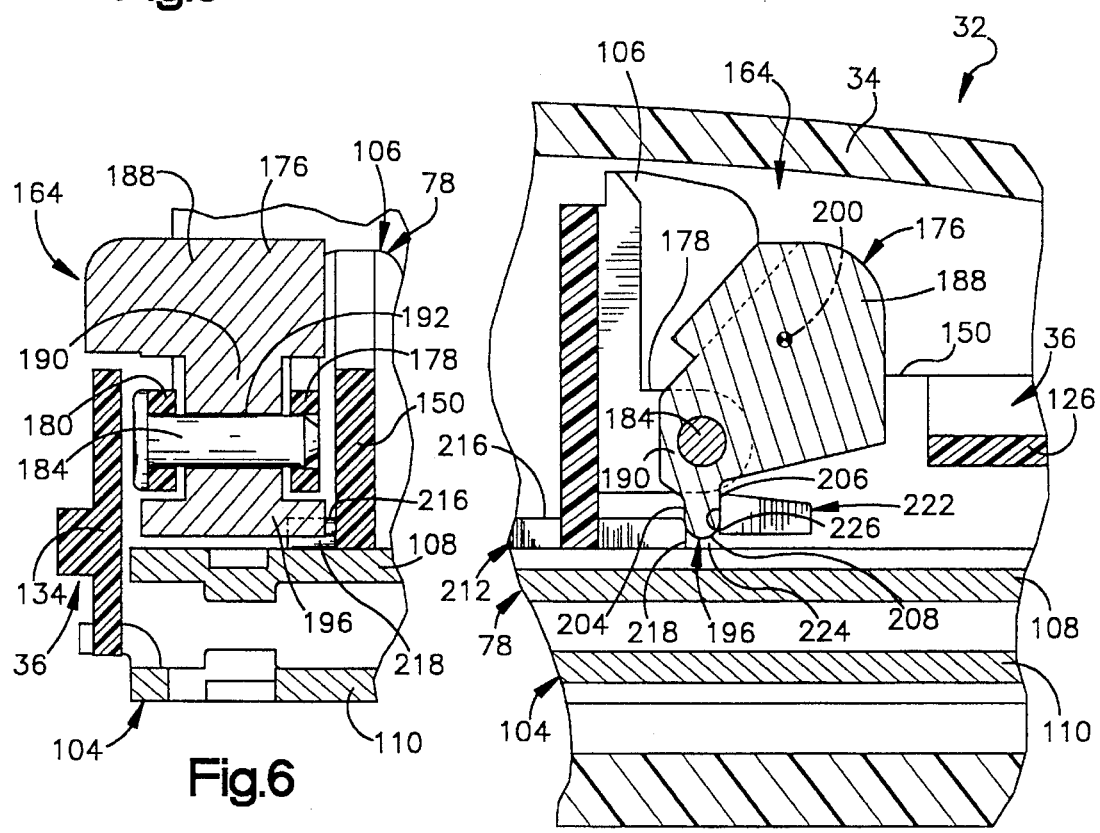
Fig.6
Fig.7

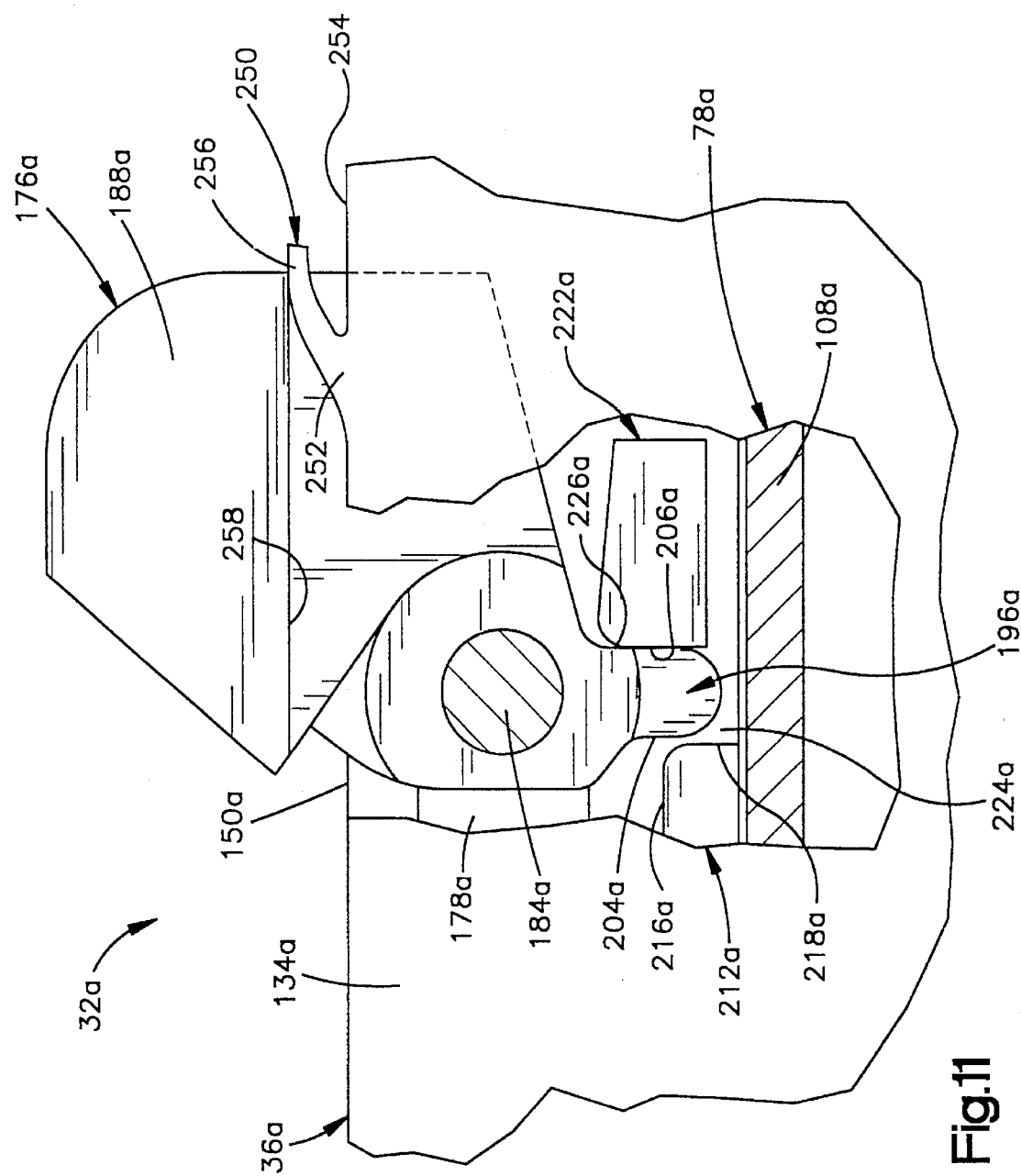

INERTIA SENSITIVE BUCKLE FOR SEAT BELT PRETENSIONER SYSTEM

BACKGROUND OF THE INVENTION

The present invention relates to a new and improved apparatus for use with a seat belt for restraining a vehicle occupant.

A known apparatus for use with a seat belt includes a pretensioner assembly which is operable to move a seat belt buckle through a pretensioning stroke to remove slack from the seat belt. At the end of the pretensioning stroke, movement of the buckle is abruptly stopped. When this occurs, inertia of an actuator member in the buckle may tend to move the actuator member and effect operation of the buckle to release a tongue connected with the seat belt. In order to prevent release of the tongue, it has been suggested that a mass be used to apply a force against the actuator member to offset the inertia of the actuator member.

SUMMARY OF THE INVENTION

The present invention provides a new and improved apparatus for use with a seat belt for restraining a vehicle occupant. The apparatus includes a pretensioner which is connected with a seat belt buckle and which is operable to move the buckle through a pretensioning stroke to remove slack from the seat belt. The buckle includes an actuator member which is manually movable to operate the buckle and release a tongue for movement from the buckle.

The buckle also includes a cam follower which transmits force from a counterbalance mass to an end surface of a cam to resist movement of the actuator member upon operation of the pretensioner to an end of the pretensioning stroke. In one embodiment of the buckle, a pair of masses cooperate with a pair of cams to resist movement of the actuator member at the end of a pretensioning stroke. During manual movement of the actuator member to operate the buckle to release the tongue, the cam follower slides along a longitudinal surface on the cam.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 1 is a schematic pictorial illustration of an apparatus embodying the present invention;

FIG. 2 is a sectional view of a seat belt buckle used in the apparatus of FIG. 1;

FIG. 5 is an enlarged fragmentary view of a portion of the seat belt buckle of FIG. 3;

FIG. 6 is a fragmentary sectional view, taken generally along the line 6—6 of FIG. 5, illustrating the manner in which the counterbalance mass is supported in the seat belt buckle;

FIG. 7 is a fragmentary sectional view, taken generally along the line 7—7 of FIG. 5, illustrating the counterbalance mass in an initial position;

FIG. 11 is fragmentary side view of a portion of a second embodiment of the invention.

DESCRIPTION OF SPECIFIC PREFERRED EMBODIMENTS OF THE INVENTION

Safety Apparatus

Figure 3:
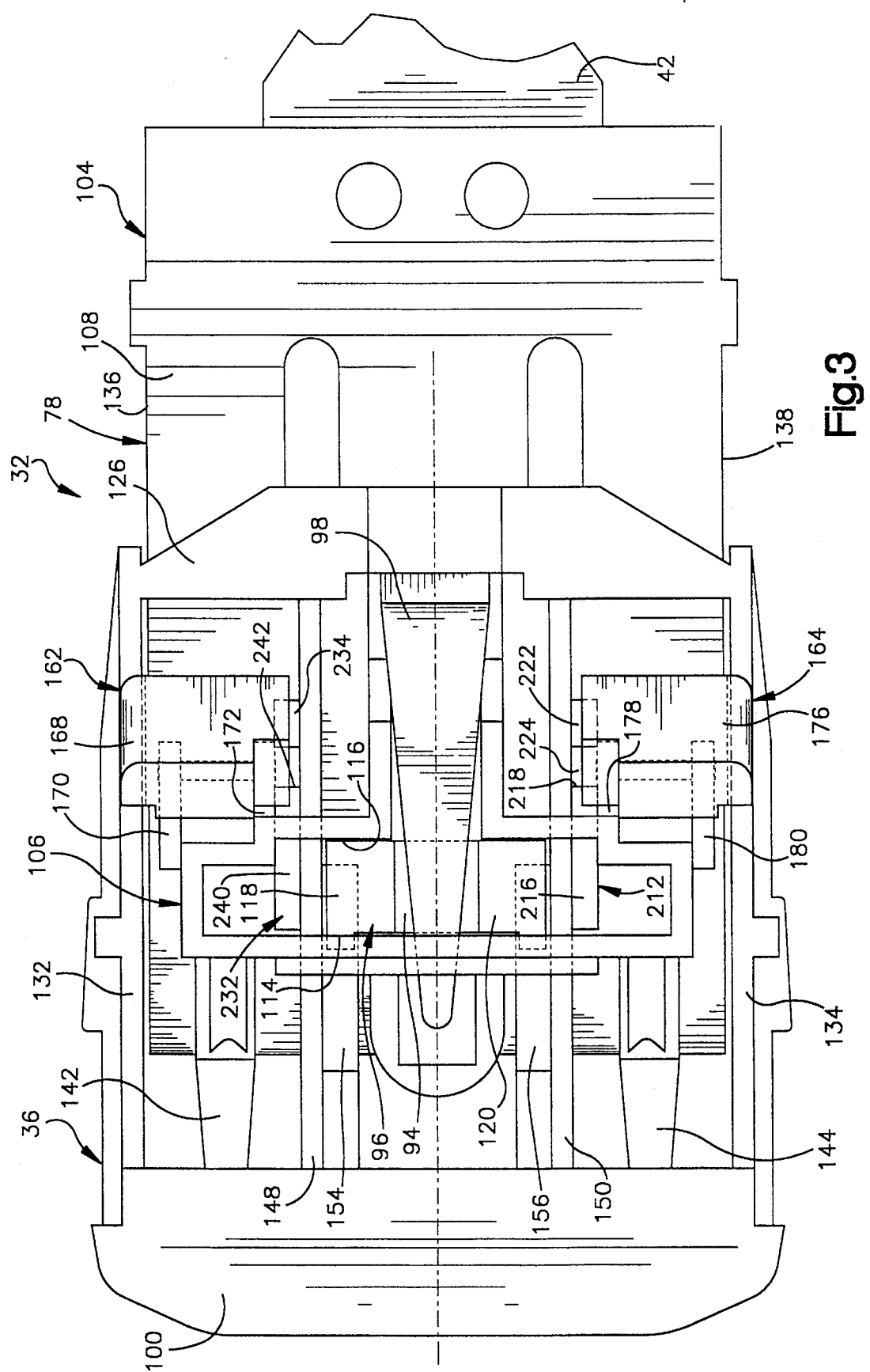
FIG. 3 is a view with parts removed, taken generally along line 3—3 of FIG. 2, further illustrating the construction of the seat belt buckle.

A vehicle safety apparatus 20 (FIG. 1) includes a seat belt 22 which extends around an occupant of a vehicle. A metal tongue 24 has an outer end portion 26 with an opening 28 through which the seat belt 22 extends. The tongue 24 is disposed in a buckle 32. The buckle 32 has an outer housing or casing 34. The buckle 32 is operated to release the tongue 24 by manually depressing an actuator member 36.

A pretensioner 40 is operable to remove slack from the seat belt 22 in the event of sudden vehicle deceleration. The pretensioner 40 includes a slide 42 which is connected to the buckle 32. The slide 42 is movable along a slot 44 in an anchor plate 46. The anchor plate 46 is secured to the vehicle by a mounting bolt 48.

A cable 52 extends around a pulley 54 on the mounting bolt 48 and is connected to the slide 42. The end of the cable 52 opposite from the slide 42 is connected with a piston and cylinder assembly 58. The piston and cylinder assembly 58 includes a cylinder 60 which is fixedly connected to a base 62. The base 62 is connected to the vehicle.

A piston 66 is disposed within the cylinder 60. The cable 52 is connected with the piston. The piston 66 divides the cylinder 60 into a rod end chamber 68 and a head end chamber 70. A gas generator 72 is connected in fluid communication with the rod end chamber 68.

Upon sudden vehicle deceleration, the gas generator 72 is activated to provide a flow of gas into the rod end chamber 68. The fluid pressure in the rod end chamber 68 moves the piston 66 toward the right (as viewed in FIG. 1) through a pretensioning stroke. During movement of the piston 66 through the pretensioning stroke, the cable 52 pulls the buckle 32 and tongue 24 downwardly (as viewed in FIG. 1) to remove slack from the seat belt 22.

At the end of the pretensioning stroke, rightward (as viewed in FIG. 1) movement of the piston 66 is abruptly stopped. This results in movement of the buckle 32 being abruptly stopped. The abrupt stopping of movement of the buckle 32 at the end of the pretensioning stroke tends to result in the actuator member 36 moving relative to the housing 34 under the influence of inertia of the actuator member. If the actuator member 36 moves through a sufficient distance relative to the housing 34, the buckle 32 may be actuated to a disengaged condition to release the tongue 24 and seat belt 22.

Buckle

The buckle 32 (FIG. 2) includes a base 78 which is fixedly connected with the slide 42. With the exception of the portion of the base 78 which is connected with the slide 42, the base is enclosed by the housing 34. The tongue 24 is inserted into the housing 34 through an opening 82 at the left (as viewed in FIG. 2) end of the housing 34.

Upon insertion of the tongue 24 into the housing, an ejector member 86 is moved toward the right (as viewed in FIG. 2) against the influence of an ejector spring 88. As the tongue 24 continues to be inserted into the housing 34, a rectangular opening 92 in the tongue 24 moves into alignment with a rectangular body portion 94 of a metal latch member 96. A leaf spring 98 presses the latch member 96 downward (as viewed in FIG. 2) into the opening 92 in the tongue 24. The latch member 96 is then effective to retain the tongue 24 in the buckle 32.

To release the tongue 24, an outer end portion 100 of the actuator member 36 is manually depressed to move the actuator member toward the right (as viewed in FIG. 2). As the actuator member is depressed, the latch member 96 is moved upward against the influence of the leaf spring 98 to operate the buckle 32 to a disengaged condition. While the buckle 32 is operated to the disengaged condition, the latch member 96 is moved out of the opening 92 in the tongue 24. As this occurs, the ejector spring 88 moves the ejector member 86 towards the left (as viewed in FIG. 2) to eject the tongue 24 from the buckle 32.

The base 78 of the buckle 32 includes a metal base plate 104 and a molded plastic latch guide section 106 which are fixedly interconnected. The base plate 104 includes a rectangular upper plate section 108 which is formed as one piece with and is parallel to a rectangular lower plate section 110. The upper and lower plate sections 108 and 110 are fixedly connected with the slide 42.

The latch guide section 106 of the base 78 has a pair of parallel guide surfaces 114 and 116 (FIG. 3) which engage flanges 118 and 120 which extend in opposite directions from the rectangular body portion 94 of the latch member 96. The guide surfaces 114 and 116 extend perpendicular to the base plate 104 and guide movement of the latch member 96 along a linear path which extends perpendicular to the base plate 104. The guide surfaces 114 and 116 guide movement of the latch member between the engaged position shown in FIG. 2, in which the body portion 94 of the latch member is received in the opening 92 in the tongue 24, and a disengaged position in which the body portion 94 of the latch member 96 is disposed above (as viewed in FIG. 2) the tongue 24. When the latch member 96 is in the disengaged position, the tongue 24 can be withdrawn from the buckle 32.

The actuator member 36 includes the manually engageable outer end portion 100 (FIG. 3) and an inner end portion 126. The outer end portion 100 and inner end portion 126 have parallel longitudinal axes. The parallel longitudinal axes of the outer end portion 100 and inner end portion 126 extend perpendicular to the path of movement of the actuator member 36 relative to the base 78.

Elongated guide sections 132 and 134 (FIG. 3) of the actuator member 36 extend between the outer end portion 100 and inner end portion 126 of the actuator member. The guide sections 132 and 134 have parallel longitudinal axes which extend perpendicular to the longitudinal axes of the outer end portion 100 and the inner end portion 126 of the actuator member 36. The guide sections 132 and 134 have projections (not shown) which extend between the upper plate section 108 and the lower plate section 110 (FIG. 2) of the base plate 104. The guide sections 132 and 134 cooperate with the base plate 104 to guide movement of the actuator member 36 between the unactuated position shown in FIG. 3 and an actuated position in which the actuator member is rightward of the unactuated position. Movement of the actuator member 36 between the unactuated and actuated positions is along a path which extends parallel to opposite edge portions 136 and 138 of the base plate 104 and perpendicular to the path of movement of the latch member 96 between the engaged and disengaged positions.

The actuator member 36 has projections (not shown) which engage the ejector member 86 (FIG. 2). Upon movement of the actuator member 36 toward the right from the unactuated position shown in FIGS. 2 and 3 to the actuated position, the projections on the actuator member 36 apply force against the ejector member 86. This force moves the ejector member 86 toward the right against the influence of the ejector spring 88.

The ejector spring 88 is effective to urge the ejector member 86 and actuator member 36 toward the left (as viewed in FIG. 2). A pair of spring arms 142 and 144 (FIG. 3) are also effective to urge the actuator member 36 toward the left. The spring arms 142 and 144 are molded as portions of the latch guide section 106.

Parallel elongated central sections 148 and 150 of the actuator member 36 extend between the outer end portion 100 and inner end portion 126 of the actuator member. The central sections 148 and 150 are disposed between and extend parallel to the guide sections 132 and 134. The guide sections 132 and 134 and the central sections 148 and 150 extend rightward from the outer end portion 100 of the actuator member 36, that is, in the direction of movement of the actuator member from the unactuated position shown in FIG. 3 toward the actuated position. The central sections 148 and 150 extend through slots formed in the latch guide section 106 of the base 78.

Latch cams 154 and 156 are connected with central sections 148 and 150. The latch cam 154 is molded as one piece with the central section 148 of the actuator member 36. The latch cam 154 is disposed on a side of the central section 148 toward the latch member 96. The latch cam 154 engages a lower side surface of the latch flange 118 on the latch member 96.

The latch cam 156 is molded as one piece with the central section 150 of the actuator member 36. The latch cam 156 is disposed on a side of the central section 150 toward the latch member 96. The latch cam 156 engages a lower side surface of the latch flange 120.

The actuator member 36 is molded as a single piece of polymeric material. Thus, the outer end portion 100, inner end portion 126, elongated guide sections 132 and 134, central sections 148 and 150, and latch cams 154 and 156 are molded as one piece.

The general construction of the buckle 32 is the same as is disclosed in U.S. Pat. No. 4,622,727 issued Nov. 18, 1986 and entitled "Buckle for a Safety Belt". However, it should be understood that the specific construction of the buckle 32 may be different than the construction set forth in the aforementioned patent and from the construction illustrated in FIGS. 2 and 3 herein.

Counterbalance Assemblies

In accordance with a feature of the present invention, a pair of counterbalance assemblies 162 and 164 (FIG. 3) are provided in the buckle 32. The counterbalance assemblies 162 and 164 are effective to apply force to the actuator member 36 at the end of a pretensioning stroke. The force applied to the actuator member 36 by the counterbalance assemblies 162 and 164 prevents movement of the actuator member under the influence of its own inertia upon operation of the pretensioner 40 (FIG. 1) to an end of a pretensioning stroke.

The counterbalance assembly 162 (FIG. 3) includes a metal counterbalance mass 168. The counterbalance mass 168 is pivotally mounted on a pair of parallel support arms 170 and 172. The support arms 170 and 172 are molded as one piece with the latch guide section 106 of the base 78.

Similarly, the counterbalance assembly 164 (FIG. 3) includes a metal counterbalance mass 176. The counterbalance mass 176 is pivotally mounted on a pair of parallel support arms 178 and 180. The support arms 178 and 180 are molded as one piece with the latch guide section 106 of the base 78.

The counterbalance masses 168 and 176 are mounted for pivotal movement at locations disposed between the guide sections 132 and 134 (FIG. 3) of the actuator member 36. The counterbalance masses do not extend outward past the elongated guide sections 132 and 134. Therefore, the counterbalance assemblies 162 and 164 in the buckle 32 do not require enlarging the housing 34 of the buckle to accommodate the counterbalance assemblies.

The support arms 178 and 180 (FIGS. 5 and 6) for the counterbalance mass 176, are disposed between the guide section 134 and central section 150 of the actuator member 36. A metal support pin 184 (FIG. 6) extends between the support arms 178 and 180. The support pin 184 supports the counterbalance mass 176 for pivotal movement about an axis which extends perpendicular to the direction of movement of the actuator member 36 and through the guide section 134 and the central section 150.

The counterbalances masses 168 and 176 are supported by the support arms 170, 172, 178 and 180 for pivotal movement about coincident axes which extend parallel to the base plate 104. The coincident axes about which the counterbalance masses 168 and 176 are pivotal extend perpendicular to longitudinal axes of the guide sections 132 and 134 and to longitudinal axes of the central sections 148 and 150.

Figure 4:
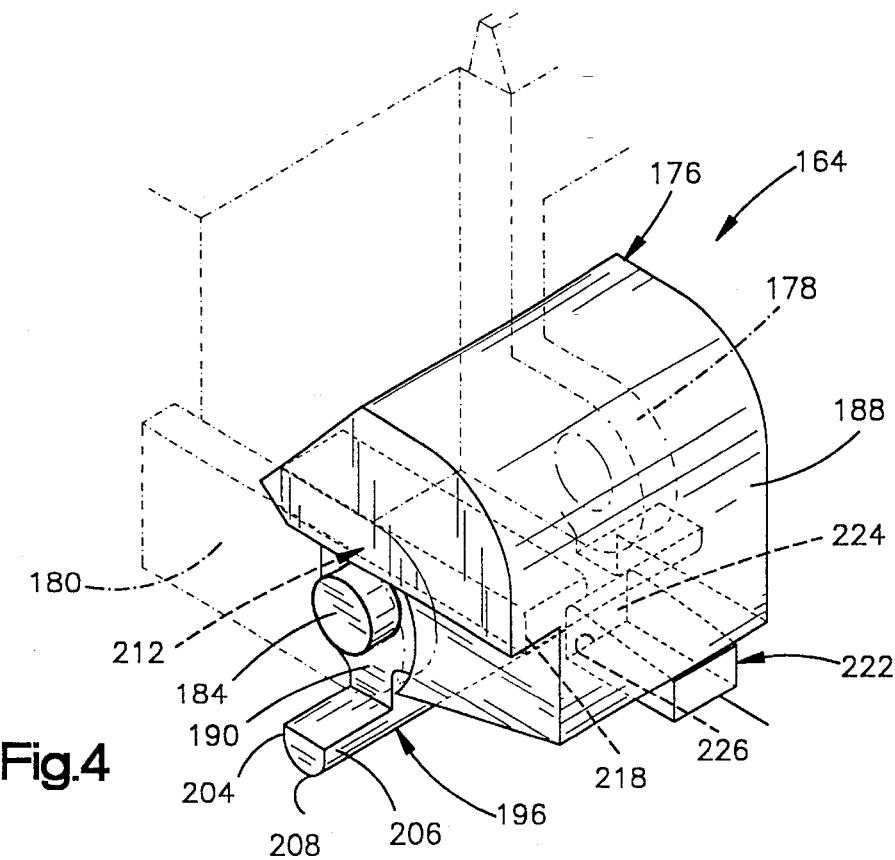
FIG. 4 is a schematic pictorial illustration of a counterbalance mass used in the seat belt buckle of FIG. 3.

The counterbalance mass 176 (FIG. 4) includes a main body section 188 and a mounting section 190. A cylindrical opening 192 (FIG. 6) extends through the mounting section 190 and receives the support pin 184. The counterbalance mass 176 also includes a cam follower section 196 (FIG. 4) which extends from the mounting section 190.

The cam follower section 196, mounting section 190 and main body section 188 of the counterbalance mass 176 are cast as one piece of metal. In one specific embodiment of the counterbalance assembly 164, the counterbalance mass 176 was die cast of zinc alloy No. 5 and had a mass of 3.2 to 3.7 grams. In this specific embodiment of the counterbalance mass 176, the distance from the center of gravity of the counterbalance mass, indicated schematically at 200 in FIG. 7, to the central axis of the support pin 184 was approximately 4.75 millimeters. The effective moment arm, which is the perpendicular distance between the center of gravity 200 and a line which is parallel to the direction of insertion of the tongue and which line intersects the center of the pin 184, is 3.32 millimeters. In this specific embodiment of the buckle 32, the actuator member 36 had a mass of approximately 8 grams.

The counterbalance mass 168 in the counterbalance assembly 162 (FIG. 3) is a mirror image of the counterbalance mass 176 in the counterbalance assembly 164. The counterbalance 168 has the same weight, that is, between 3.2 and 3.7 grams, as the counterbalance mass 176. The counterbalance mass 176 also has a distance of about 4.75 millimeters between a center of gravity and the axis about which it pivots. The effective moment arm for the counterbalance mass 168 is the same as the effective moment arm of the counterbalance mass 176.

The cam follower section 196 of the counterbalance mass 176 has parallel side surfaces 204 and 206 (FIG. 7) which are interconnected by an arcuate nose portion 208. The cam follower section 196 of the counterbalance mass 176 is engageable with a counterbalance cam 212 (FIGS. 3, 4, 5 and 7). The counterbalance cam 212 has a longitudinal central axis which extends parallel to the base plate 104 and to the longitudinal central axis of the central section 150. The longitudinal central axis of the counterbalance cam 212 extends perpendicular to the path of movement of the latch member 96 between the engaged and disengaged positions.

The counterbalance cam 212 has a flat longitudinally extending upper side surface 216 (FIG. 7) which extends parallel to the longitudinal central axis of the counterbalance cam and to the base plate 104. The upper side surface 216 of the counterbalance cam 212 has a longitudinal axis which extends perpendicular to the coincident axes about which the counterbalance masses 168 and 176 pivot. The longitudinal axis of the upper side surface 216 of the counterbalance cam 212 extends parallel to longitudinal axes of the guide sections 132 and 134 and central sections 148 and 150. In addition, the counterbalance cam 212 has a flat end surface 218 which extends perpendicular to the flat upper side surface 216 of the counterbalance cam. The flat upper side surface 216 of the counterbalance cam 212 has a length which is slightly greater than the distance through which the actuator member 36 moves between the unactuated and actuated positions.

A counterbalance actuator 222 (FIGS. 3, 4, 5, and 7) is disposed adjacent to and is spaced from the counterbalance cam 212. A gap or space 224 is formed between the end surface 218 (FIG. 7) on the counterbalance cam 212 and an end surface 226 on the counterbalance actuator 222. The end surface 218 on the counterbalance cam 212 extends parallel to the end surface 226 on the counterbalance actuator 222. The end surface 226 on the counterbalance actuator 222 extends further upward, that is, toward the support pin 184, than does the end surface 218 on the counterbalance cam 212.

The counterbalance cam 212 and the counterbalance actuator 222 (FIGS. 5 and 7) are molded as one piece with the central section 150 of the actuator member 36. The counterbalance cam 212 and counterbalance actuator are disposed on a side of the central section 150 opposite from the latch cam 156 (FIG. 3). The latch cam 156 and counterbalance cam 212 have longitudinal axes which are disposed in planes which extend perpendicular to the base plate 104 and parallel to the longitudinal central axes of the guide section 134 and central section 150.

The counterbalance mass 168 (FIG. 3) cooperates with a counterbalance cam 232 which has the same construction as the counterbalance cam 212. A counterbalance actuator 234 is disposed adjacent to and is spaced from the counterbalance cam 232. The counterbalance cam 232 and counterbalance actuator 234 (FIG. 3) are molded as one piece with the longitudinally extending central section 148 of the actuator member 36.

The counterbalance cam 232 has a flat upper side surface 240 (FIG. 3) which is disposed in the same plane as the upper side surface 216 of the counterbalance cam 212. The upper side surface 240 of the counterbalance cam 232 has a longitudinal axis which is parallel to the longitudinal axes of the guide sections 132 and 134 and the central sections 148 and 150. The counterbalance cam 232 has an end surface 242 which is disposed in the same plane as the end surface 218 of the counterbalance cam 212. The counterbalance cam 232 has the same configuration and length as the counterbalance cam 212. The counterbalance actuator 234 has the same configuration as the counterbalance actuator 222.

Operation

Prior to insertion of the tongue 24 into the buckle 32, the actuator member 36 is in the unactuated position of FIGS. 2 and 3. At this time, the ejector member 86 (FIG. 2) is located between a lower end of the body portion 94 of the latch member 96 and the lower plate section 110 of the base plate 104. The leaf spring 98 presses the body portion 94 of the latch member 96 against the ejector member 86.

Also at this time, the counterbalance assembly 164 is in the unactuated condition of FIG. 7. Thus, the cam follower section 196 of the counterbalance mass 176 is disposed in the gap 224 between the counterbalance cam 212 and the counterbalance actuator 222. The side surface 204 on the cam follower section 196 engages the end surface 218 on the counterbalance cam 212.

Prior to insertion of the tongue 24 into the buckle 32, the counterbalance assembly 162 is in the same unactuated condition as the counterbalance assembly 164. Thus, a cam follower section of the counterbalance mass 168 is disposed in a gap between the counterbalance cam 232 and counterbalance actuator 234 (FIG. 3).

Upon insertion of the tongue 24 into the buckle 32, a leading end of the tongue engages the ejector member 86. The tongue 24 then moves the ejector member 86 toward the right (as viewed in FIG. 2). As this occurs, the ejector member 86 moves out of engagement with the latch member 96. As the tongue 24 continues to be inserted into the buckle 32, the leaf spring 98 presses the latch member 96 downward and the body portion 94 of the latch member moves into the opening 92 in the tongue 24. Movement of the latch member 94 to the engaged position shown in FIG. 2 results in the tongue 24 being securely retained in the buckle 32.

As the tongue 24 is inserted into the buckle 32, the actuator member 36 remains stationary. Therefore, the counterbalance assemblies 162 and 164 remain stationary in their unactuated condition, corresponding to the unactuated condition illustrated in FIG. 7 for the counterbalance assembly 164.

When the tongue 24 is to be disconnected from the buckle 32, force is manually applied against the outer end portion 100 of the actuator member 36 (FIG. 2). This moves the actuator member inward, that is, toward the right as viewed in FIGS. 2 and 3. As the actuator member 36 moves inward, the end surface 218 (FIG. 7) on the counterbalance cam 212 applies force against the side surface 204 on the cam follower section 196 of the counterbalance mass 176. This pivots the counterbalance mass 176 in a counterclockwise direction (as viewed in FIG. 7) about the support pin 184.

Figure 10:
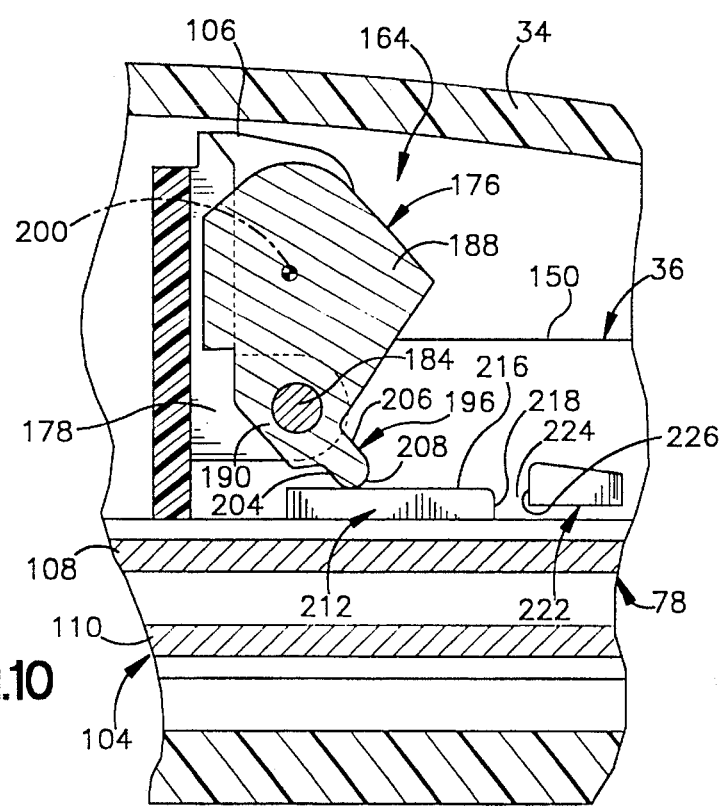
FIG. 10 (on sheet 3 of the drawings) is an enlarged fragmentary sectional view, generally similar to FIG. 7, illustrating the counterbalance mass in the actuated position.
Figure 8:
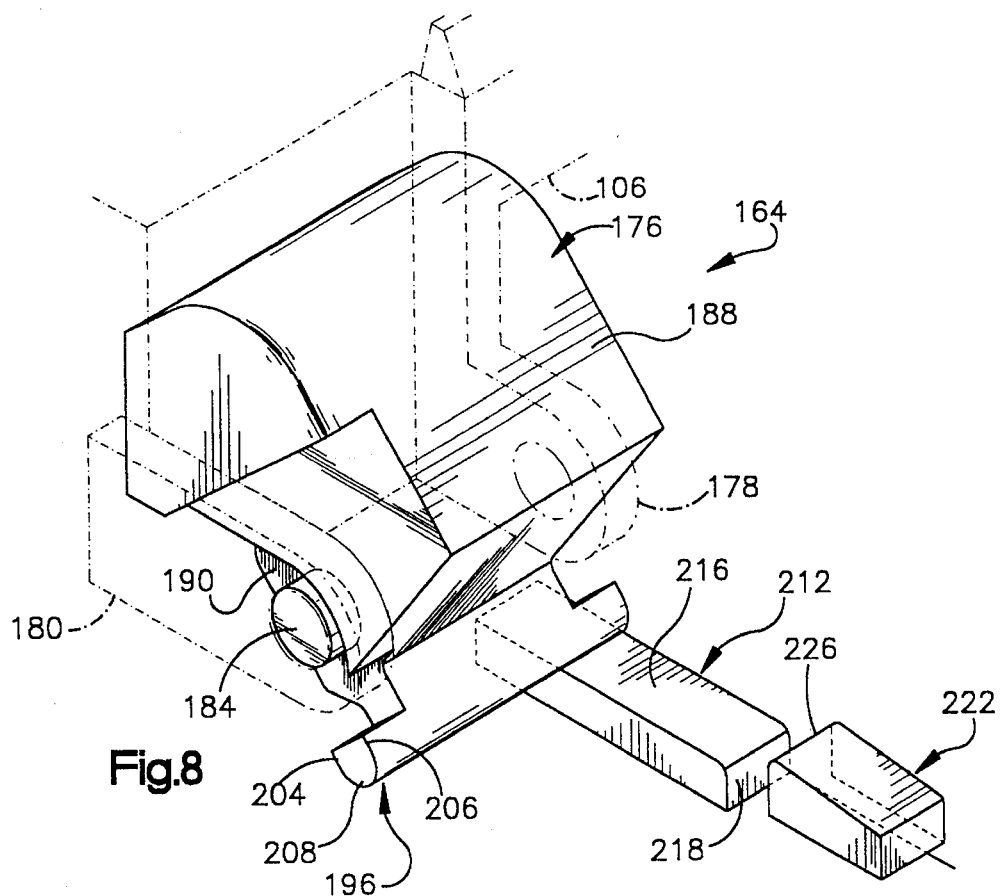
FIG. 8 is a pictorial illustration, generally similar to FIG. 4, illustrating the counterbalance mass in an actuated position.
Figure 9:
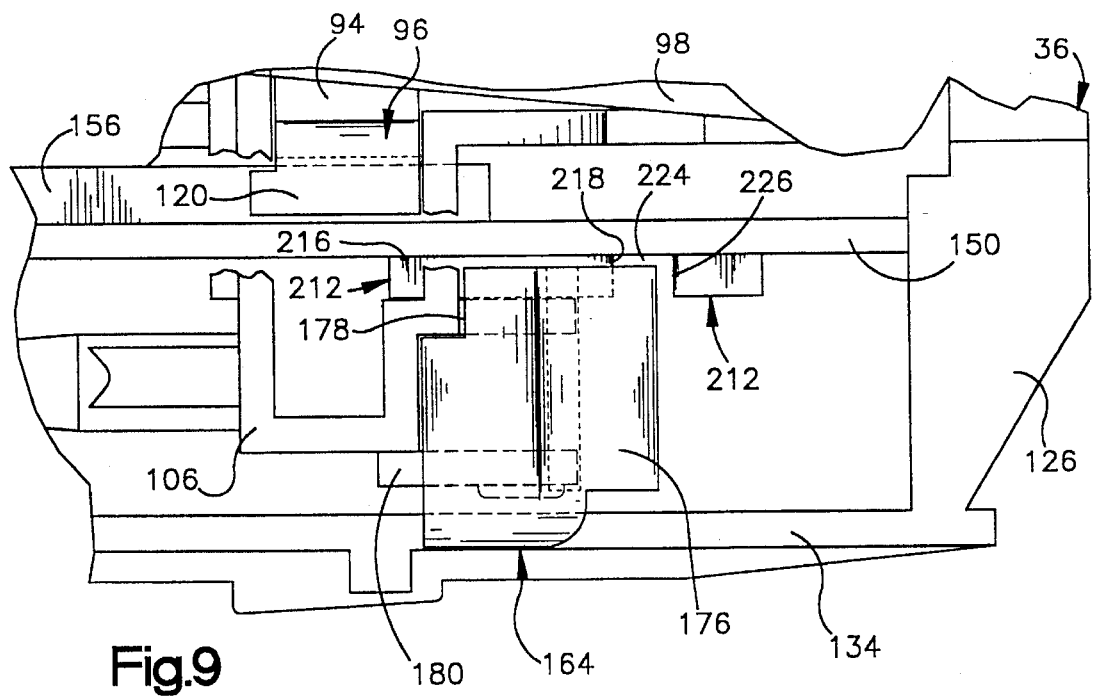
FIG. 9 is a fragmentary plan view, generally similar to FIG. 5, illustrating the relationship between the counterbalance mass and other components of the seat belt buckle when the counterbalance mass is in the actuated position of FIG. 8.

As the counterbalance mass 176 is pivoted by a force applied against the cam follower section 196 by the counterbalance cam 212, the cam follower section moves out of the gap 224 between the counterbalance cam and counterbalance actuator 222. When the cam follower section 196 moves out of the gap 224, the nose portion 208 of the cam follower section 196 moves into engagement with the upper side surface 216 of the counterbalance cam 212 (FIGS. 8, 9 and 10). As the actuator member 36 continues to be manually pressed into the buckle housing 34, the counterbalance cam 212 moves toward the right (as viewed in FIGS. 8–10) relative to the counterbalance mass 176. While the counterbalance cam 212 moves toward the right, the flat upper side surface 216 of the counterbalance cam 212 slides along the nose portion 208 of the cam follower section 196.

When the actuator member 36 is manually moved inward, the counterbalance mass 168 is pivoted by the counterbalance cam 232 (FIG. 3) simultaneously with pivoting of the counterbalance mass 176. The counterbalance cam 232 then slides along a cam follower section of the counterbalance mass 168.

As the actuator member 36 is initially moved into the buckle housing 34, as previously explained, the latch cams 154 and 156 (FIG. 3) move into engagement with the flanges 118 and 120 on the latch member 96. The latch cams 154 and 156 then move the latch member 96 upward (as viewed in FIG. 2) against the influence of the leaf spring 98. When the actuator member 36 approaches the end of its stroke, the latch cams 154 and 156 will have moved the lower (as viewed in FIG. 2) end of the body portion 94 of the latch member 96 out of the opening 92 in the tongue 24.

When the body portion 94 of the latch member 96 moves out of the opening 92 in the tongue 24, the force applied against the ejector member 86 by the ejector spring 88 is effective to move the ejector member toward the opening 82 (FIG. 2). At the same time, the tongue 24 is pushed part way out of the buckle 32 by the ejector member 86. Releasing the actuator member 36 then permits the actuator member and the ejector member 86 to be moved outward by the ejector spring 88 to fully eject the tongue 24 from the buckle 32.

As the actuator member 36 is released and is returned to its unactuated position by the ejector spring 88, the upper side surface 216 of the counterbalance cam 212 moves toward the left (as viewed in FIG. 10) along the nose portion 208 of the cam follower section 196. When the gap 224 approaches the nose portion 208 of the cam follower section 196, the nose portion of the cam follower section moves out of engagement with the upper side surface 216 of the counterbalance cam 212 and into engagement with the end surface 226 on the counterbalance actuator 222. Continued movement of the actuator member 36 toward the left causes the counterbalance actuator 222 to pivot the counterbalance mass 176. Thus, the counterbalance mass 176 is pivoted in a clockwise direction about the support pin 184 from the orientation shown in FIG. 10 to the orientation shown in FIG. 7. As this occurs, the cam follower section 196 moves into the gap 224 (FIG. 7).

FIGS. 7 and 10 only illustrate the manner in which the counterbalance mass 176 in the counterbalance assembly 164 pivots relative to the base 78. Nonetheless, the counterbalance mass 168 in the counterbalance assembly 162 is pivoted in the same manner and at the same time by the interaction between the counterbalance cam 232 and the counterbalance actuator 234 with the counterbalance mass 168.

The forces applied against the actuator member 36 by the counterbalance masses 168 and 176 in the counterbalance assemblies 162 and 164 are of the same magnitude and are spaced the same distance from the center line of the actuator member. Therefore, there is little or no tendency for the forces applied to the actuator member 36 by the counterbalance masses 168 and 176 to cause a twisting or binding of the actuator member 36 as it moves between the actuated and unactuated position.

In the event of sudden vehicle deceleration when the tongue 24 is in the buckle 32, the pretensioner 40 (FIG. 1) is operated to move the buckle 32 downward along the anchor plate 46. As this occurs, slack is removed from the seat belt 22 to tighten the seat belt around an occupant of the vehicle in which the safety apparatus 20 is installed.

As the buckle 32 is accelerated downward during the initial portion of the pretensioner stroke, the inertia of the actuator member 36 urges the actuator member toward the left (as viewed in FIG. 2). At the same time, the inertia of the counterbalance mass 176 (FIG. 7) in the counterbalance assembly 164 tends to pivot the counterbalance mass in a counterclockwise direction (as viewed in FIG. 7) about the support pin 184. This results in the application of rightward force against the counterbalance actuator 222 by the cam follower section 196. The counterbalance mass 168 in the counterbalance assembly 162 tends to pivot in the same manner as the counterbalance mass 176 in the counterbalance assembly 164. This results in the counterbalance masses 168 and 176 applying force against the counterbalance actuators 234 and 222 urging the actuator member 36 away from the unactuated position shown in FIG. 3 toward the right and toward the actuated position of the actuator member.

The force applied to the actuator member 36 by the counterbalance masses 168 and 176 is approximately equal to the inertia force of the actuator member 36 itself. As a result, the actuator member 36 and the counterbalance masses 168 and 176 remain in their unactuated positions during the initial portion of the pretensioning stroke. The spring arms 142 and 144 (FIG. 3) act in the same direction as the inertia of the actuator member 36 during the initial portion of the pretensioning stroke and assist the inertia of the actuator member in maintaining the actuator member in its unactuated position.

When the piston 66 in the piston and cylinder assembly 58 of the pretensioner 40 reaches the end of its pretensioning stroke, downward (as viewed in FIG. 1) movement of the buckle 32 is suddenly interrupted. In the absence of the counterbalance assemblies 162 and 164, the inertia of the actuator member 36 might possibly cause it to move away from its unactuated position toward its actuated position through a distance sufficient to enable latch cams 154 and 156 to disengage the latch member 96 from the tongue 24. However, the counterbalance assemblies 162 and 164, along with spring arms 142, 144, are effective to apply forces to the actuator member 36 which offset the inertia of the actuator member itself so that the actuator member remains in its unactuated position.

As the downward movement of the buckle 32 is stopped at the end of the pretensioning stroke, the counterbalance mass 176 (FIG. 7) tends to pivot in a clockwise direction about the support pin 184. This is because the center of gravity 200 of the counterbalance mass 164 tends to keep moving toward the right (as viewed in FIG. 7). The clockwise pivoting inertia of the counterbalance mass 176 results in the cam follower section 196 of the counterbalance mass applying a leftward (as viewed in FIG. 7) force against the end surface 218 of the counterbalance cam 212. This leftward force urges the actuator member 36 toward its unactuated position.

The counterbalance mass 168 is also effective to apply a leftward (as viewed in FIG. 3) force against the actuator member 36 urging the actuator member toward its unactuated position. The leftward (as viewed in FIG. 3) forces applied against the actuator member 36 by the counterbalance masses 168 and 176 are equal to the rightward inertia force of the actuator member itself. Therefore, there is a zero net inertia force urging the actuator member 36 away from its unactuated position. The spring arms 142 and 144 press against the outer end portion 100 of the actuator member 36 to assist the counterbalance assemblies 162 and 164 in maintaining the actuator member in its unactuated position.

Second Embodiment

Due to manufacturing tolerances, the cam follower section 196 (FIG. 7) may fit loosely into the gap 224 when the actuator member 36 is in the unactuated position. Since the buckle 32 is in the upright orientation illustrated in FIG. 1, the weight of the counterbalance mass 176 results in the side surface 206 (FIG. 7) on the cam follower section 196 moving away from the end surface 226 on the counterbalance actuator 222. It is believed that even though the space between the side surface 206 on the cam follower section 196 and the end surface 226 on the counterbalance actuator 222 is relatively small, for example, approximately 0.2 millimeters, the space might be sufficient to enable the counterbalance mass 176 to accelerate during the initial portion of the operation of the pretensioner. This would result in an increase in the force applied to the actuator member 36 by the counterbalance mass 176 during the initial portion of operation of the pretensioner.

In the embodiment of the invention illustrated in FIG. 11, space between the cam follower section of the counterbalance mass and the counterbalance actuator is eliminated when the actuator member is in the unactuated position. Since the components of the embodiment of the invention illustrated in FIG. 11 are generally similar to the components of the embodiment of the invention illustrated in FIGS. 1–10, similar numerals will be utilized to designate similar components, the suffix letter "a" being added to the numerals of FIG. 11 to avoid confusion.

A buckle 32a (FIG. 11) includes a counterbalance mass 176a which is pivotally mounted on a support pin 184a. The support pin 184a extends between a support arm 178a and a support arm (not shown) corresponding to the support arm 180 of FIG. 6. The support pin 184a is disposed between a guide section 134a and a central section 150a of an actuator member 36a.

The counterbalance mass 176a has a cam follower section 196a. When the actuator member 36a is in the unactuated position shown in FIG. 11 the cam follower section 196a extends downward into a gap 224a. The gap 224a is disposed between a counterbalance cam 212a and a counterbalance actuator 222a.

In accordance with a feature of this embodiment of the invention, a side surface 206a on the cam follower section 196a is in engagement with an end surface 226a on the counterbalance actuator 222a when the actuator member 36a is in the unactuated position. At this time, a side surface 204a on the cam follower section 196a is spaced from an end surface 218a on the counterbalance cam 212a. The side surface 204a on the cam follower section is spaced from the end surface 218a on the counterbalance cam 212a by a distance which is a function of manufacturing tolerances provided between the end surface on the counterbalance cam and the side surface 206a on the counterbalance actuator 222a. Although the distance between the end surface 218a on the counterbalance cam 212a and the side surface 204a on the cam follower section 196a of the counterbalance mass 176a may vary, the distance between the end surface 218a on the counterbalance cam 212a and the side surface 204a on the cam follower section 196a may be approximately 0.2 millimeters.

The side surface 206a on the cam follower section 196a is pressed against the end surface 226a on the counterbalance actuator 222a by a spring 250. The spring 250 is molded as one piece with the guide section 134a of the actuator member 36a. The spring 250 has a base portion 252 which is connected with an upper (as viewed in FIG. 11) side 254 of the guide section 134a. The spring 250 has a resiliently deflectable outer portion 256 which engages a surface 258 on a main body section 188a of the counterbalance mass 176a.

The outer portion 256 of the spring 250 applies force against the surface 258 on the counterbalance mass 176.

This force urges the counterbalance mass in a counterclockwise direction about the support pin 184*a*. The force applied against the counterbalance mass 176*a* by the spring 250 presses the side surface 206*a* on the cam follower section 196*a* of the counterbalance mass against the side surface 226*a* on the counterbalance actuator 222*a*.

Upon initiation of operation of a pretensioner connected with the buckle 32*a*, the buckle is moved toward the right (as viewed in FIG. 11). As the buckle 32*a* is accelerated toward the right during the initial portion of the pretensioner stroke, the inertia of the actuator member 36*a* urges the actuator member leftward (as viewed in FIG. 11) toward the unactuated position. At the same time, the inertia of the counterbalance mass 176*a* tends to pivot the counterbalance mass in a counterclockwise direction (as viewed in FIG. 11) about the support pin 184*a*. This results in the application of rightward force against the counterbalance actuator 222*a* by the cam follower section 196*a*.

The force applied by the spring 250 against the counterbalance mass 176*a* results in the side surface 206*a* on the cam follower section 196*a* being pressed against the end surface 226*a* on the counterbalance actuator 222*a* prior to initiation of operation of the pretensioner. Therefore, when the initial portion of the pretensioner stroke occurs, the counterbalance mass 176*a* is not pivoted about the support pin 184*a* in such a manner as to impact the cam follower section 196*a* against the counterbalance actuator 222*a*.

The combined inertia force applied against the actuator member 36*a* by the counterbalance mass 176*a* and a second counterbalance mass (not shown) corresponding to the counterbalance mass 168 of FIG. 3 is offset by the inertia of the actuator member. Therefore, the actuator member 36*a* remains stationary relative to the upper plate section 108*a* of the base 78*a* during the initial portion of the pretensioner stroke. Spring arms, corresponding to the spring arms 142 and 144 of FIG. 3, assist the inertia of the actuator member 36*a* in maintaining the actuator member stationary relative to the base 78*a*.

If there were space between the side surface 206*a* on the cam follower section 196*a* and the end surface 226*a* on the counterbalance actuator 222*a* due to manufacturing tolerances, the counterbalance mass 176*a* might possibly be accelerated and strike the counterbalance actuator 222*a* upon initiation of a pretensioner stroke. The force of the impact would urge the actuator member 36*a* toward its unactuated position.

In the embodiment of the invention illustrated in FIG. 11, the cam follower section 196*a* of the counterbalance mass 176*a* is pressed against the counterbalance actuator 222*a* by a spring 250 connected with the guide section 134*a* of the actuator member 36*a*. However, it is contemplated that the resiliently deflectable spring 250 could be replaced by a solid projection which would extend upwardly (as viewed in FIG. 11) from the upper side 254 of the guide section 134*a* into engagement with the surface 258 on the counterbalance mass 176*a*. It is also contemplated that the spring 250 could be replaced by a separate metal coil spring which would be connected between the support arm 178*a* and the counterbalance mass 176*a*. This coil spring would resiliently urge the counterbalance mass 176*a* to rotate in a counterclockwise direction (as viewed in FIG. 11) about the support pin 184*a* to press the cam follower section 196*a* against the counterbalance actuator 222*a*.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for use with a seat belt, said apparatus comprising:

a tongue;

a buckle for receiving and retaining said tongue, said buckle including a base, an actuator member movable relative to said base from an unactuated position to an actuated position to effect operation of said buckle to release said tongue for movement from said buckle, a cam connected with said actuator member and having a longitudinally extending surface and an end surface, a mass movable relative to said base, and a cam follower connected with said mass, said longitudinally extending surface on said cam being slidable along said cam follower during at least a portion of the movement of said actuator member between the unactuated and actuated positions; and a pretensioner connected with said buckle and operable to move said buckle through a pretensioning stroke to remove slack from the seat belt;

said cam follower having surface means for applying force resulting from inertia of said mass to said end surface on said cam to resist movement of said actuator member to the actuated position upon operation of said pretensioner.

2. An apparatus as set forth in claim 1 wherein said buckle includes means for supporting said mass for pivotal movement about an axis which extends perpendicular to a longitudinal axis of said longitudinally extending surface on said cam.

3. An apparatus as set forth in claim 1 further including means for applying force to said mass urging said mass to a position in which said cam follower is spaced from said end surface on said cam when said actuator member is in the unactuated position.

4. An apparatus as set forth in claim 1 wherein said longitudinally extending surface on said cam has a length which is at least as great as a major portion of the distance through which said actuator member moves relative to said base during movement of said actuator member between the actuated and unactuated positions.

5. An apparatus as set forth in claim 1 wherein said buckle further includes a second cam connected with said actuator member and having a longitudinally extending surface and an end surface, a second mass movable relative to said base, and a second cam follower connected with said second mass, said longitudinally extending surface on said second cam being slidable along said second cam follower during at least a portion of the movement of said actuator member between the unactuated and actuated positions, said second cam follower having surface means for applying force resulting from inertia of said second mass to said end surface on said second cam to resist movement of said actuator member to the actuated position upon operation of said pretensioner to the end of the pretensioning stroke.

6. An apparatus as set forth in claim 1 wherein said actuator member has a manually engageable end portion and a pair of parallel guide sections which engage said base and guide movement of said actuator member relative to said base between the unactuated and actuated positions, said mass being at least partially disposed between said guide sections of said actuator member.

7. An apparatus as set forth in claim 6 wherein said buckle further includes a spring element connected with one of said guide sections to apply force against said mass urging said mass toward a predetermined position relative to said base when said actuator member is in the unactuated position.

8. An apparatus as set forth in claim 1 wherein said base includes mounting means for supporting said mass for pivotal movement relative to said base, said actuator member having a manually engageable end portion and a plurality of sections which extend from said manually engageable end portion of said actuator member in the direction of movement of said actuator member from the unactuated position to the actuated position, said mounting means being disposed between said sections of said actuator member.

9. An apparatus as set forth in claim 8 wherein said longitudinally extending surface on said cam is connected with said sections of said actuator member and is movable along a path which extends between said mounting means and a portion of said base during movement of said actuator member between the unactuated and actuated positions.

10. An apparatus for use with a seat belt, said apparatus comprising:

a tongue;

a buckle for receiving and retaining said tongue;

said buckle including a base, an actuator member movable relative to said base from an unactuated position to an actuated position to effect operation of said buckle to release said tongue for movement from said buckle, said actuator member having a manually engageable end portion and first and second sections which extend from said manually engageable end portion of said actuator member in the direction of movement of said actuator member from the unactuated position to the actuated position, and a mass pivotally mounted at a location disposed between said sections of said actuator member; and a pretensioner connected with said buckle and operable to move said buckle through a pretensioning stroke to remove slack from the seat belt, said buckle including means for transmitting force resulting from inertia of said mass to said actuator member upon operation of said pretensioner.

11. An apparatus as set forth in claim 10 wherein said buckle includes a second mass pivotally mounted at a location between said sections of said actuator member, and means for transmitting force resulting from inertia of said second mass to said actuator member upon operation of said pretensioner.

12. An apparatus as set forth in claim 10 further including a cam connected with said first and second sections for movement therewith relative to said base, said cam having a longitudinally extending surface and an end surface, said means for transmitting force resulting from inertia of said mass to said actuator member including a cam follower which is connected with said mass, said longitudinally extending surface on said cam being slidable along said cam follower during at least a portion of the movement of said actuator member between the actuated and unactuated positions, said cam follower having surface means for applying force resulting from inertia of said mass to said end surface on said cam to resist movement of said actuator member to the actuated position upon operation of said pretensioner.

13. An apparatus for use with a seat belt, said apparatus comprising:

a tongue;

a buckle for receiving and retaining said tongue;

said buckle including a base, an actuator member movable relative to said base from an unactuated position to an actuated position to effect operation of said buckle to release said tongue for movement from said buckle;

a first mass movable relative to said base, and a second mass movable relative to said base;

a pretensioner connected with said buckle and operable to move said buckle through a pretensioning stroke to remove slack from the seat belt;

said buckle including first means for transmitting force resulting from inertia of said first mass to a first portion of said actuator member upon operation of said pretensioner and second means for transmitting force resulting from inertia of said second mass to a second portion of said actuator member upon operation of said pretensioner; and said actuator member further including a manually engageable end portion and first and second parallel sections which extend from said manually engageable end portion of said actuator member in the direction of movement of said actuator member from the unactuated position to the actuated position, said first and second sections being disposed in engagement with said base to guide movement of said actuator member along said base, said first mass being pivotal relative to said base between said first and second sections, said second mass being pivotal relative to said base between said first and second sections.

14. An apparatus as set forth in claim 13 wherein said first mass is pivotal about a first axis which extends perpendicular to longitudinal axes of said first and second sections, said second mass being pivotal about a second axis.

15. An apparatus as set forth in claim 14 further including means connected with said first section for positioning said first mass relative to said base when said actuator member is in the unactuated position and means connected with said second section for positioning said second mass relative to said base when said actuator member is in the unactuated position.

16. An apparatus for use with a seat belt said apparatus comprising:

a tongue;

a buckle for receiving and retaining said tongue;

said buckle including a base, an actuator member movable relative to said base from an unactuated position to an actuated position to effect operation of said buckle to release said tongue for movement from said buckle;

a first mass movable relative to said base, and a second mass movable relative to said base;

a pretensioner connected with said buckle and operable to move said buckle through a pretensioning stroke to remove slack from the seat belt;

said buckle including first means for transmitting force resulting from inertia of said first mass to a first portion of said actuator member upon operation of said pretensioner and Second means for transmitting force resulting from inertia of said second mass to a second portion of said actuator member upon operation of said pretensioner;

said buckle further including a latch member which is engageable with said tongue, said latch member being movable relative to said base between an engaged position in which said latch member is effective to block withdrawal of said tongue from said buckle and a disengaged position in which said latch member is ineffective to block withdrawal of said tongue from said buckle, said first mass being pivotally connected at a first location for pivotal movement about an axis which extends perpendicular to the path of movement of said latch member between said engaged and disengaged positions, said second mass being pivotally connected at a second location for pivotal movement about an axis which extends perpendicular to the path of movement of said latch member between the engaged and disengaged positions.

17. An apparatus for use with a seat belt, said apparatus comprising:

a tongue;

a buckle for receiving and retaining said tongue;

said buckle including a base, an actuator member movable relative to said base from an unactuated position to an actuated position to effect operation of said buckle to release said tongue for movement from said buckle;

a first mass movable relative to said base, and a second mass movable relative to said base;

a pretensioner connected with said buckle and operable to move said buckle through a pretensioning stroke to remove slack from the seat belt;

said buckle including first means for transmitting force resulting from inertia of said first mass to a first portion of said actuator member upon operation of said pretensioner and second means for transmitting force resulting from inertia of said second mass to a second portion of said actuator member upon operation of said pretensioner;

said buckle further including a first cam connected with said actuator member and having a longitudinally extending surface, a first cam follower connected with said first mass, said longitudinally extending surface on said first cam being slidable along said first cam follower during at least a portion of the movement of said actuator member between the actuated and unactuated positions, a second cam connected with said actuator member and having a longitudinally extending surface which is parallel to the longitudinally extending surface of said first cam, a second cam follower connected with said second mass, said longitudinally extending surface on said second cam being slidable along said second cam follower during at least a portion of the movement of said actuator member between the actuated and unactuated positions.

18. An apparatus as set forth in claim 17 wherein said first mass is connected with said base for pivotal movement about a first axis which extends perpendicular to longitudinal axes of said longitudinally extending surfaces on said first and second cams and said second mass is connected with said base for pivotal movement about a second axis which extends perpendicular to the longitudinal axes of said longitudinally extending surfaces on said first and second cams.

19. An apparatus for use with a seat belt, said apparatus comprising:

a tongue;

a buckle for receiving and retaining said tongue;

said buckle including a base, an actuator member movable relative to said base from an unactuated position to an actuated position to effect operation of said buckle to release said tongue for movement from said buckle;

a first mass movable relative to said base, and a second mass movable relative to said base;

a pretensioner connected with said buckle and operable to move said buckle through a pretensioning stroke to remove slack from the seat belt;

said buckle including first means for transmitting force resulting from inertia of said first mass to a first portion of said actuator member upon operation of said pretensioner and second means for transmitting force resulting from inertia of said second mass to a second portion of said actuator member upon operation of said pretensioner;

said first mass is movable relative to said base from a first position to a second position and said second mass is movable relative to said base from a third position to a fourth position, said buckle including first means for moving said first mass from the first position to the second position during an initial portion of the movement of said actuator member from the unactuated position toward the actuated position and for maintaining said first mass in the second position during a second portion of the movement of said actuator member from the unactuated position toward the actuated position, said buckle including second means for moving said second mass from the third position to the fourth position during the initial portion of the movement of said actuator member from the unactuated position toward the actuated position and for maintaining said second mass in the fourth position during the second portion of the movement of said actuator member from the unactuated position toward the actuated position.

20. An apparatus as set forth in claim 19 wherein said buckle includes means for applying force to said first mass urging said first mass to the first position when said actuator member is in the unactuated position and means for applying force to said second mass urging said second mass to the third position when said actuator member is in the unactuated position.

21. An apparatus for use with a seat belt, said apparatus comprising:

a tongue having an opening;

a buckle, said buckle including a base lying in a plane which intersects opposite sides of said buckle, said buckle including a latch movable in a first direction into said opening to latch said tongue in said buckle and movable in a second direction opposite said first direction to release said tongue for movement from said buckle;

an actuator member movable in a direction parallel to the plane in which said base lies from an unactuated position to an actuated position to move said latch in said second direction out of said opening to release said tongue for movement from said buckle;

a first mass movable relative to said base, and a second mass movable relative to said base;

a pretensioner connected with said buckle and operable to move said buckle through a pretensioning stroke to remove slack from the seat belt;

said buckle further including a first means for transmitting force resulting from inertia of said first mass to a first portion of said actuator member upon operation of said pretensioner and a second means for transmitting force resulting from inertia of said second mass to a second portion of said actuator member upon operation of said pretensioner; and means supporting said first mass and said second mass for pivotal movement about an axis which is parallel to the plane in which said base lies and transverse to the first direction of movement of said latch into said opening.

* * * * *